United States Patent [19]

Kushima

[11] Patent Number: 4,896,028
[45] Date of Patent: Jan. 23, 1990

[54] SURGE ABSORPTION APPARATUS

[75] Inventor: Hidekiyo Kushima, Kanagawa, Japan

[73] Assignee: Kabushiki Kaisha Toshiba, Kawasaki, Japan

[21] Appl. No.: 314,127

[22] Filed: Feb. 23, 1989

Related U.S. Application Data

[62] Division of Ser. No. 60,387, Jun. 10, 1987, Pat. No. 4,825,060.

[30] Foreign Application Priority Data

Jun. 11, 1986 [JP] Japan .................................. 61-133767

[51] Int. Cl.$^4$ .......................................... G06K 19/06
[52] U.S. Cl. ...................................... 235/492; 361/91
[58] Field of Search ................... 235/492; 361/91, 100

[56] References Cited

U.S. PATENT DOCUMENTS 4,736,271 4/1988 Mack ..................................... 361/91

Primary Examiner—Harold I. Pitts
Attorney, Agent, or Firm—Cushman, Darby & Cushman

[57] ABSTRACT

A surge absorption apparatus including a common constant voltage element having a first terminal and a second terminal, and a plurality of independent constant voltage elements each having a first terminal and a second terminal, the second terminals of the independent constant voltage elements being commonly connected to the second terminal of the common constant voltage element. The common constant voltage element and the independent constant voltage elements comprise constant voltage element diodes, respectively, and the first terminals of the common constant voltage element and the independent constant voltage elements are anodes while the second terminals of the common constant voltage element and the independent constant voltage elements are cathodes.

9 Claims, 5 Drawing Sheets

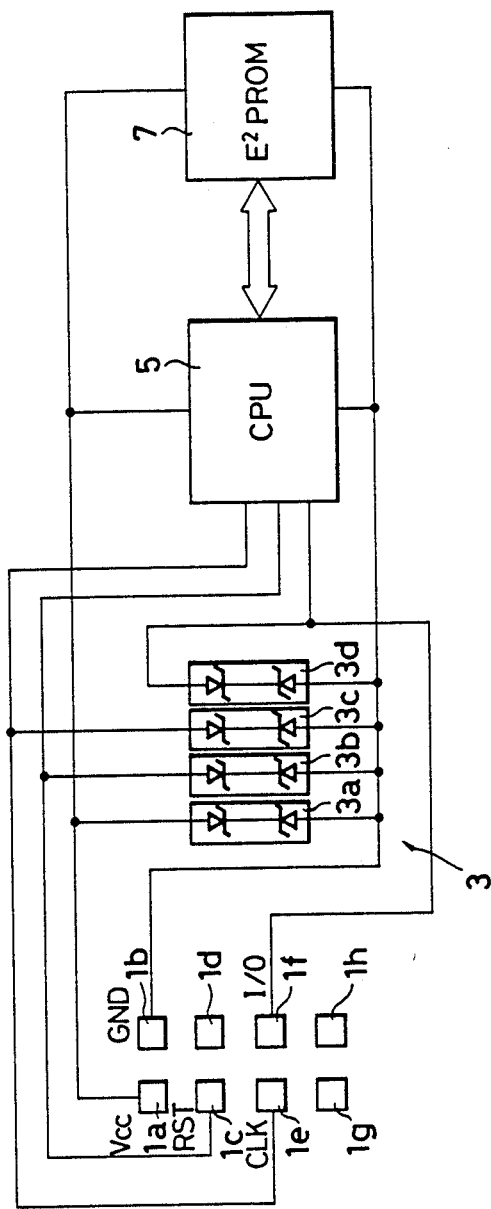

FIG.IB
PRIOR ART
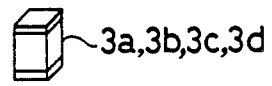
FIG.2A
PRIOR ART
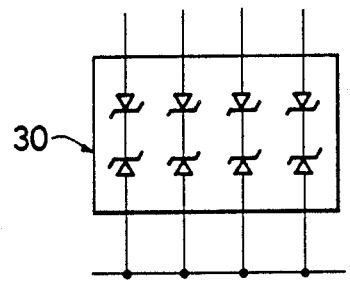
FIG.2B
PRIOR ART
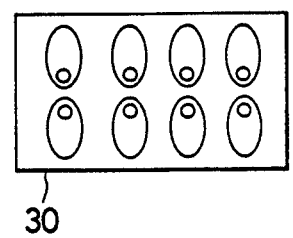

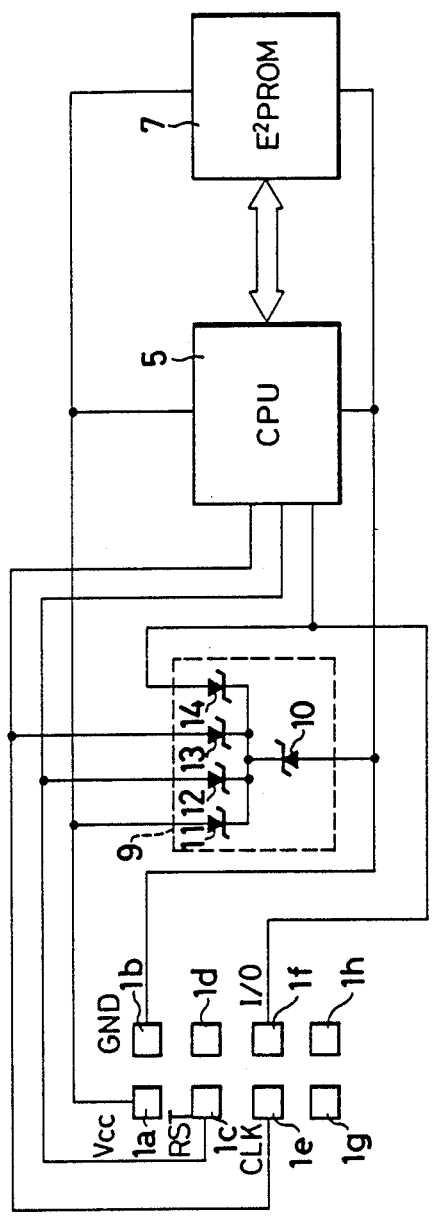

SURGE ABSORPTION APPARATUS

This is a division of Application No. 07/060,387, filed June 10, 1987, now Pat. No. 4825060.

BACKGROUND OF THE INVENTION

1. Field of the Invention

The present invention relates to a surge absorption apparatus provided in an electronic device, for example, an IC card, for protecting internal apparatuses of the electronic device against external static electricity.

2. Description of the Prior Art

An IC card complies with the ISO standards for its various performances. Among the ISO standards, there is an electrostatic test. The IC card is carried by a person under various environmental conditions and frequently subjected to an external large static electricity. The IC card has a plurality of connection terminals to be electrically connected to an external apparatus such as an automatic transaction machine (ATM) installed in banking agencies, and the connection terminals are internally connected to IC chips such as a microcomputer and a memory circuit. If these internal IC chips are subjected to the static electricity, they may be destroyed.

An object of the electrostatic test of the ISO standards is to prevent the IC card from easily being destroyed by such external static electricity. The IC card has a common connection terminal, i.e., a grounding terminal (GND) for supplying common potential, and a plurality of independent connection terminals such as a power source voltage terminal (Vcc), an input/output terminal, a reset signal terminal, and a clock signal terminal. The electrostatic test of the ISO standards applies 1,500 volts charged in a capacitor of 100 pF to positions between the grounding terminal and the respective independent connection terminals through a resistor of 1,000 ohms to see whether or not the internal circuits of the IC card can withstand the applied electricity.

The IC card is equipped with, therefore, a surge absorption apparatus which can withstand the test and protect the internal circuits of the IC card against external static electricity.

FIG. 1A is a circuit diagram showing an IC card having a prior art surge absorption apparatus. The IC card has connection terminals 1a to 1h for connecting the IC card to an external apparatus. The connection terminals are, for instance, a power source voltage terminal (Vcc) 1a, a grounding terminal (GND) 1b, a reset signal terminal (RST) 1c, a clock signal terminal (CLK) 1e, an input/output terminal (I/O) 1f, etc. The respective connection terminals are connected through a surge absorption apparatus 3 to integrated circuit chips such as a CPU 5 comprising a microprocessor, and a memory circuit 7 comprising an E²PROM.

The surge absorption apparatus 3 has four zener diode blocks 3a, 3b, 3c, and 3d arranged in parallel with each other, each comprising a pair of zener diodes connected in series in reverse polarity. Each of the zener diode blocks 3a, 3b, 3c, and 3d has a first and a second zener diodes, cathodes of which are internally interconnected, and is formed as a single semiconductor element of a rectangular parallelepiped. The four zener diode blocks constitute the surge absorption apparatus 3.

Anodes of the first zener diodes of the zener diode blocks 3a, 3b, 3c, and 3d are connected commonly and connected to the grounding terminal 1b. An anode of the second zener diode of the first zener diode block 3a is connected to the power source voltage terminal 1a, an anode of the second zener diode of the second zener diode block 3b to reset signal terminal 1c, an anode of the second zener diode of the third zener diode block 3c to the clock signal terminal 1e, and an anode of the second zener diode of the fourth zener diode block 3d to the input/output terminal 1f.

In the IC card having the surge absorption apparatus 3 of the above arrangement, when static electricity or an extremely high voltage such as 1,500 volts in the electrostatic test of the ISO standards is applied between the grounding terminal 1b and the respective terminals i.e., the power source voltage terminal 1a, reset signal terminal 1c, clock signal terminal 1e, and input/output terminal 1f, the zener breakdown or the avalanche breakdown of the zener diodes is caused to prevent the internal circuits connected to the respective connection terminals from being destroyed.

Namely, the zener diode blocks 3a, 3b, 3c, and 3d are connected between the grounding terminal 1b and the connection terminals 1a, 1c, 1e, and 1f respectively, and, when a high voltage of, for instance, 1,500 volts of any polarity is applied between the terminals, one of the zener diodes of each of the zener diode blocks is in the forward direction with respect to the applied voltage. Accordingly, most of the high voltage is given to the other zener diodes of the zener diode blocks, and the other zener diodes will demonstrate the zener breakdown or the avalanche breakdown with respect to the high voltage to decrease the applied high voltage to a constant voltage of the zener diodes. In this way, even if a high voltage is applied between the terminals, the voltage between the terminals is suppressed to the constant voltage of the zener diodes, for instance 6.5 volts, so that the high voltage is not applied to the internal circuits connected to the terminals, thereby preventing the internal circuits from being destroyed by the high voltage.

FIG. 2A is a circuit diagram showing another example of the prior art surge absorption apparatus used for an IC card. The constitution of this surge absorption apparatus 30 is similar to that of the surge absorption apparatus 3 shown in FIG. 1A. A difference between them is that the surge absorption apparatus 3 shown in FIG. 1A has four separate zener diode elements each having a rectangular parallelepiped with a pair of zener diodes, and the surge absorption apparatus 30 shown in FIG. 2A comprises eight zener diodes which are formed by diffusion on a single semiconductor chip as shown in FIG. 2B. The constitution inside the IC card connected to the surge absorption apparatus 30 is the same as that of the circuit shown in FIGS. 1A and 1B.

As shown in FIG. 2B, by forming the surge absorption apparatus 30 of eight zener diodes as a single semiconductor chip, the surge absorption apparatus may easily be assembled in the IC card.

Since the surge absorption apparatus 3 shown in FIG. 1A is made by connecting four separate zener diode block elements each having a rectangular parallelepiped, the number of assembling processes is large, deteriorating the productivity, and the size is hardly minimized, causing a problem that it is vulnerable to a bending test of the IC card.

Although the surge absorption apparatus 30 shown in FIGS. 2A and 2B is constituted by a single semiconductor chip, it requires eight zener diodes and relatively enlarges the size of its structure. Therefore, similar to the surge absorption apparatus 3 shown in FIG. 1A, the electrostatic capacitance of a junction of a zener diode of the prior art surge absorption apparatus is increased, causing problems that it may exceed the maximum capacitance, for instance 30 pF, specified by the ISO standards, and that it is vulnerable to the bending test of the IC card due to the large structure size. Since the IC card is carried by a person, it should be strong to a certain extent against bending. To check the bending strength, the ISO standards include a bending test in which a transversal twist, etc., of the IC card are checked. Since the surge absorption apparatuses shown in FIGS. 1 and 2 have relatively large structures, a large bending force is applied to elements constituting the surge absorption apparatuses, destroying the elements.

SUMMARY OF THE INVENTION

In order to solve the above problems, an object of the present invention is to provide a surge absorption apparatus which has a small electrostatic capacitance, is compact, realizes high productivity, and has a large bending strength.

In order to accomplish the objects and advantages mentioned above, the present invention provides a surge absorption apparatus including a common constant voltage element having a first terminal and a second terminal, and a plurality of independent constant voltage elements each having a first terminal and a second terminal, the second terminals of the independent constant voltage elements being commonly connected to the second terminal of the common constant voltage element. The common constant voltage element and the independent constant voltage elements comprise constant voltage element diodes, respectively, and the first terminals of the common constant voltage element and the independent constant voltage elements are anodes while the second terminals of the common constant voltage element and the independent constant voltage elements are cathodes.

BRIEF DESCRIPTION OF THE DRAWINGS

The other objects, features and advantages of the present invention will become apparent from the following descriptions of the preferred embodiments taken in conjunction with the accompanying drawings in which:

FIGS. 1A and 1B are diagrams showing a portable memory medium according to the prior art, and a structural view showing a zener diode block element used for a surge absorption apparatus of the prior art portable memory medium;

FIGS. 2A and 2B are a circuit diagram showing another prior art surge absorption apparatus used for a portable memory medium, and a plan view showing a semiconductor chip constituting the surge absorption apparatus;

FIG. 3 is a diagram showing a portable memory medium according to an embodiment of the present invention;

FIGS. 4A to 4LC are plan views showing constant voltage semiconductor chips respectively, each chip for a surge absorption apparatus used for the portable memory medium shown in FIG. 3.

DETAILED DESCRIPTION OF THE PREFERRED EMBODIMENTS

Figure 4A:
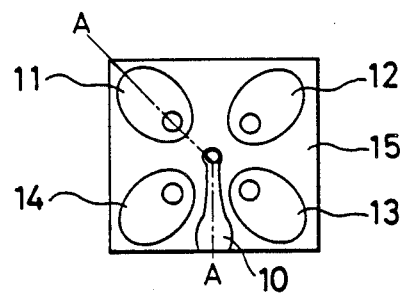

Embodiments of the present invention will be described with reference to the accompanying drawings.

FIG. 3 is a circuit diagram showing a surge absorption apparatus 9 in a portable memory medium, a so-called IC card according to an embodiment of the present invention. The IC card has, similar to the one shown in FIG. 1A, connection terminals 1a to 1h to be connected to an external apparatus. The connection terminals are, for instance, a power source voltage terminal (Vcc) 1a, a grounding terminal (GND) 1b, a reset signal terminal (RST) 1c, a clock signal terminal (CLK) 1e, an input/output terminal (I/O) 1f, etc. The connection terminals are connected through a surge absorption apparatus 9 to integrated circuit chips such as a CPU 5 comprising a microprocessor, a memory circuit 7 comprising $E^2PROM$, etc. The IC card has the same constitution as that of the IC card shown in FIG. 1 or 2 except for the surge absorption apparatus.

The surge absorption apparatus 9 of this embodiment has a common constant voltage element 10 comprising a zener diode whose anode is connected to the grounding terminal 1b, and a plurality, in this embodiment four, of independent constant voltage elements 11, 12, 13, and 14 each comprising a zener diode. Anodes of the independent constant voltage elements 11 to 14 are connected to the connection terminals 1a, 1c, 1e, and 1f, respectively. The other electrode, i.e., a cathode of the common constant voltage element 10 is commonly connected to cathodes of the independent constant voltage elements 11 to 14.

In the surge absorption apparatus 9 with the above-mentioned connections, there are a pair of zener diodes connected in series with reverse polarity between the anode terminal 1b and each of the connection terminals. When a high voltage is applied between the terminals, the zener breakdown or the avalanche breakdown is caused to lower the high voltage to a predetermined constant voltage of the zener diodes so that the high voltage applied to the connection terminals is not applied to the internal integrated circuits, thereby preventing the internal integrated circuits from being destroyed.

Figure 4B:
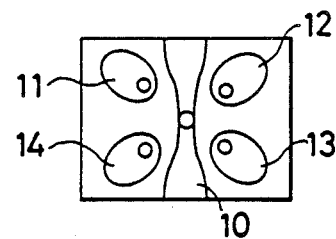
Figure 4C:
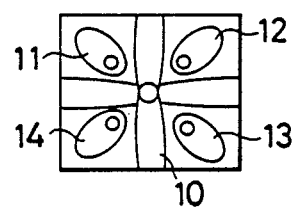

The surge absorption apparatus 9 comprises the single common constant voltage element 10 and a plurality of the independent constant voltage elements 11 to 14, which are formed in one semiconductor integrated circuit chip as shown in FIGS. 4A to 4C. According to this integrated circuit arrangement, the common constant voltage element 10 is formed near the center of a semiconductor silicon substrate 15, and, around the element 10, there are formed a plurality of the independent constant voltage elements 11 to 14.

FIGS. 4A to 4C are views showing various constitutions of the constant voltage element in the surge absorption apparatus 9. For all these constitutions, the common constant voltage element 10 is formed in the center thereof, and the independent constant voltage elements 11 to 14 are formed around the element 10. With such arrangements, one electrode, for instance a cathode of the common constant voltage element 10 formed in the center can easily be connected with a short length to cathodes of the independent constant voltage elements 11 to 14, thereby making the overall size of the chip compact. As shown in FIGS. 4A to 4C, not only the common constant voltage element 11 is formed in the center, but also a part thereof is extended between the independent constant voltage elements to connect or isolate the elements effectively with high performance.

Figure 5:
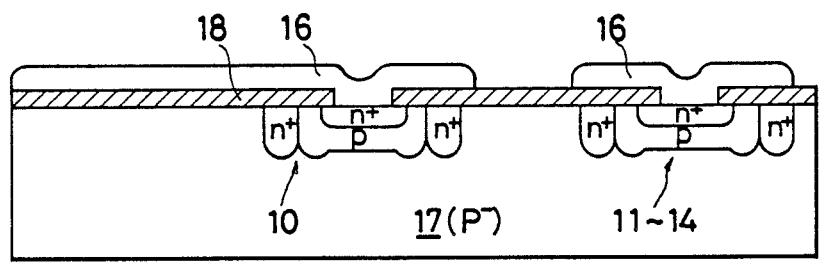
FIG. 5 is a cross-sectional view taken along line A—A shown in FIG. 4A.

FIG. 5 is a view showing the cross-sectional constitution of a constant voltage semiconductor integrated circuit chip constituting the surge absorption apparatus 9 shown in FIG. 4A. Zener diodes constituting each of the constant voltage elements are formed in a bulk layer of a semiconductor silicon substrate by a normal PN junction. The independent constant voltage elements 11 to 14 are formed around the common constant voltage element 10. A numeral 16 represents an aluminum layer, 17 the bulk layer, and 18 an oxide film.

As described in the above, according to the present invention, there is provided a portable memory medium having a constant voltage semiconductor chip in which a common connection terminal of a common constant voltage element is connected to respective independent connection terminals of a plurality of independent constant voltage elements. Therefore, an electrostatic capacitance between the common connection terminal and the respective independent connection terminals is small, and the portable memory medium, i.e., an IC card provided with such a constant voltage semiconductor chip has a relatively large strength in bending, and is easily assembled, improving the productivity.

What is claimed is:

1. A surge absorption apparatus comprising:
    a common constant voltage element having a first terminal and a second terminal; and
    a plurality of independent constant voltage elements each having a first terminal and a second terminal, the second terminals of the independent constant voltage elements being commonly connected to said second terminal of said common constant voltage element.

2. The surge absorption apparatus as claimed in claim 1, wherein said common constant voltage element and said independent constant voltage elements comprise constant voltage element diodes, respectively, and the first terminals of said common constant voltage element and said independent constant voltage elements are anodes while the second terminals of said common constant voltage element and said independent constant voltage elements are cathodes.

3. The surge absorption apparatus as claimed in claim 1, wherein said common constant voltage element and said independent constant voltage elements comprise constant voltage element diodes, respectively, and the first terminals of said common constant voltage element and said independent constant voltage elements are cathodes while the second terminals of said common constant voltage element and said independent constant voltage elements are anodes.

4. The surge absorption apparatus as claimed in claim 1, wherein said independent constant voltage elements and said common constant voltage element are formed on a singe semiconductor wafer.

5. The surge absorption apparatus as claimed in claim 2, wherein said independent constant voltage elements are disposed around said common constant voltage element.

6. A surge absorption apparatus, comprising:
    first means having a first electrode and a second electrode for electrically conducting between the first electrode and the second electrode when a voltage higher than a predetermined voltage is applied between the first electrode and the second electrode;
    second means having a plurality of first electrodes and a plurality of second electrodes for electrically conducting between the first electrodes and the second electrodes when a voltage higher than a predetermined voltage is applied between the first electrodes and the second electrodes; and
    means for connecting the second electrode of said first means and the second electrodes of said second means.

7. The surge absorption apparatus as claimed in claim 6, wherein said first means includes a zener diode and said second means includes a plurality of zener diodes whose cathodes are commonly connected.

8. A surge absorption apparatus, comprising:
    first means having a first electrode and a second electrode for electrically conducting between the first electrode and the second electrode whene a voltage higher than a predetermined voltage is applied between the first electrode and the second electrode;
    second means having a plurality of first electrodes and a plurality of second electrodes for electrically conducting between the first electrodes and the second electrodes when voltage higher than a predetermined voltage is applied between the first electrodes and the second electrodes; and
    means for connecting the first electrode of said first means and the first electrodes of said second means.

9. The surge absorption apparatus as claimed in claim 8, wherein said first means includes a zener diode and said second means includes a plurality of zener diodes whose anodes are commonly connected.

* * * * *